United States Patent [19]

Hudson

[11] 4,074,951

[45] Feb. 21, 1978

[54] WIND POWER CONVERTER

[76] Inventor: Gerald E. Hudson, 229 15th St. West, Billings, Mont. 59102

[21] Appl. No.: 764,397

[22] Filed: Jan. 31, 1977

Related U.S. Application Data

[63] Continuation-in-part of Ser. No. 576,189, May 9, 1975, abandoned.

[51] Int. Cl.² .............................................. F03D 3/04
[52] U.S. Cl. ......................................... 415/2; 416/13; 416/121; 416/122; 416/171
[58] Field of Search ....................................... 415/2–4; 416/DIG. 6, 121 A, 122, 9, 13, 21, 170, 171

[56] References Cited

U.S. PATENT DOCUMENTS

| 419,345 | 1/1890 | Otto | 416/DIG. 6 |
| 1,790,175 | 1/1931 | Spencer | 416/DIG. 6 |
| 2,335,817 | 11/1943 | Topalov | 415/2 |
| 2,379,324 | 6/1945 | Topalov | 415/3 |
| 2,563,279 | 8/1951 | Rushing | 415/3 |
| 4,017,204 | 4/1977 | Sellman | 415/2 |

FOREIGN PATENT DOCUMENTS

| 900,038 | 6/1945 | France | 416/121 A |
| 384,349 | 11/1923 | Germany | 415/2 |
| 453,231 | 12/1927 | Germany | 416/121 A |
| 810,500 | 8/1951 | Germany | 416/121 A |

Primary Examiner—Everette A. Powell, Jr.

Attorney, Agent, or Firm—Arthur L. Urban

[57] ABSTRACT

A wind power converter comprising: a pair of rotatable turbines with elongated curved blades disposed within a rotatable housing on axially parallel shafts, the curvature of the blades of one turbine being opposite to the curvature of the blades of the second turbine so that wind passing between said turbines will rotate the turbines in opposite directions; the housing comprising shaft-supporting sections at the ends of the turbines, lateral sections connecting the end sections, a pair of wind deflectors disposed between the end sections and extending from adjacent edges of the lateral sections toward the midpoint between the turbines and terminating approximately the same distance from each other as the distance between the turbine shafts, and a pivotally mounted vertically disposed vane extending from a portion of the housing opposite to the wind deflectors; said rotatable housing being supported on a vertically disposed central shaft and on a plurality of beams radiating therefrom with the free end of each beam having at least one pair of flanged wheels engaging a peripheral annular track with one wheel of each pair in contact with the top of the track and the other wheel of each pair in contact with the bottom of the track; means for synchronizing the rotation of the turbines; and fluid pumping means operatively connected to the turbine shafts.

10 Claims, 9 Drawing Figures

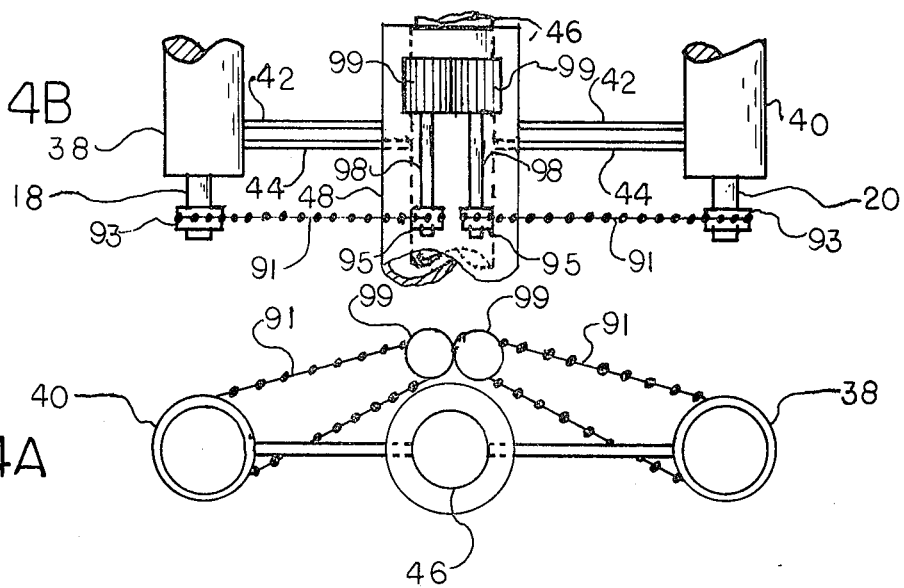
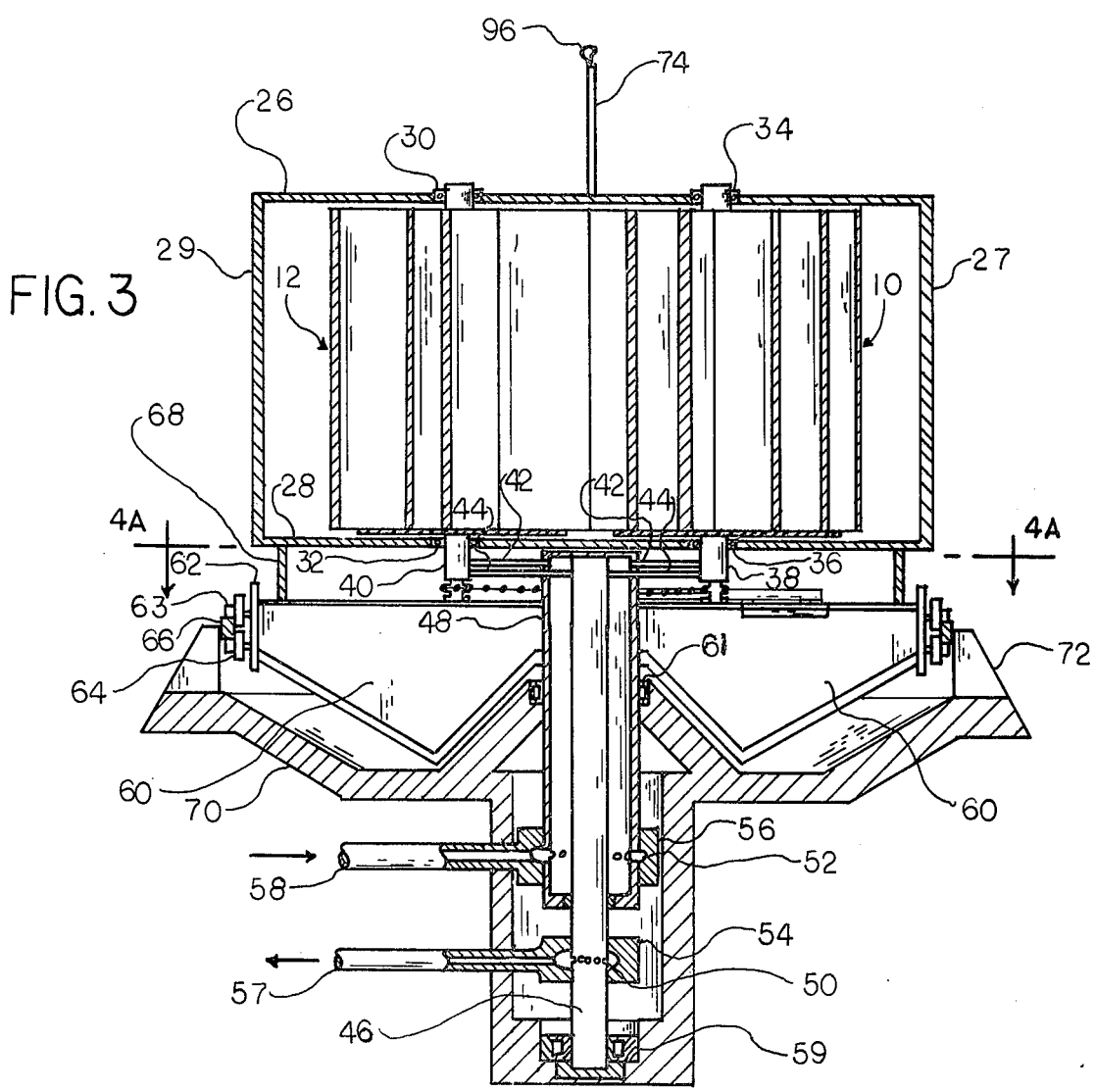

WIND POWER CONVERTER

This application is a continuation-in-part of application Ser. No. 576,189, filed May 9, 1975, now abandoned.

This invention relates to wind power apparatus and more particularly relates to wind power apparatus capable of generating power on a commercial scale efficiently and economically.

Recent shortages of petroleum have directed attention toward alternate sources of energy, but these energy sources are not without their own problems. For example, environmentalists have opposed increases in the use of coal because of land damage in mining and pollution of the atmosphere in burning of the coal. Also, they have opposed nuclear energy because of the possibility of accidental irradiation of plant workers and/or the surrounding countryside. However, there is one energy source which offers unlimited supplies of potential energy without ecological problems, namely, wind power.

While windmills have been used for many years, and are still being used, on farms and ranches to pump water or to provide limited quantities of power, the use of windmills for generating power on a commercial scale has not been successful. In many cases the windmills which have been tried have only been larger size models of simple farm windmill designs. For example, it has been proposed to construct windmills with propellers several hundred feet high. With such designs, the ends of the propellers move at very high speeds which presents problems in designing a structure which will perform efficiently and which will not require excessive maintenance.

The present invention provides a wind power converter of a novel design which is capable of generating power on a commercial scale. The wind power converter of the invention operates efficiently over a wide range of wind velocities. Furthermore, the wind power converter utilizes a high proportion of the wind contacting the apparatus for the generation of power. In addition, the wind power converter operates safely at high wind velocities which might cause damage to conventional design windmills. Moreover, the wind power converter of the present invention can be built in large sizes without encountering unusual design problems. Also, the apparatus changes position automatically with changes in wind direction to maximize efficiency.

Other benefits and advantages of the present invention will be apparent from the following description and the accompanying drawings in which:

FIG. 3 is a side elevation partially in section taken along line 3—3 of FIG. 2;

FIG. 4A is an enlarged fragmentary sectional view of the pump and turbine synchronizing portion of the apparatus taken along line 4A—4A of FIG. 3;

FIG. 4B is an enlarged fragmentary side elevation of the pump and turbine synchronizing portion of the apparatus shown in FIG. 3 taken from the opposite side;

Figure 2:
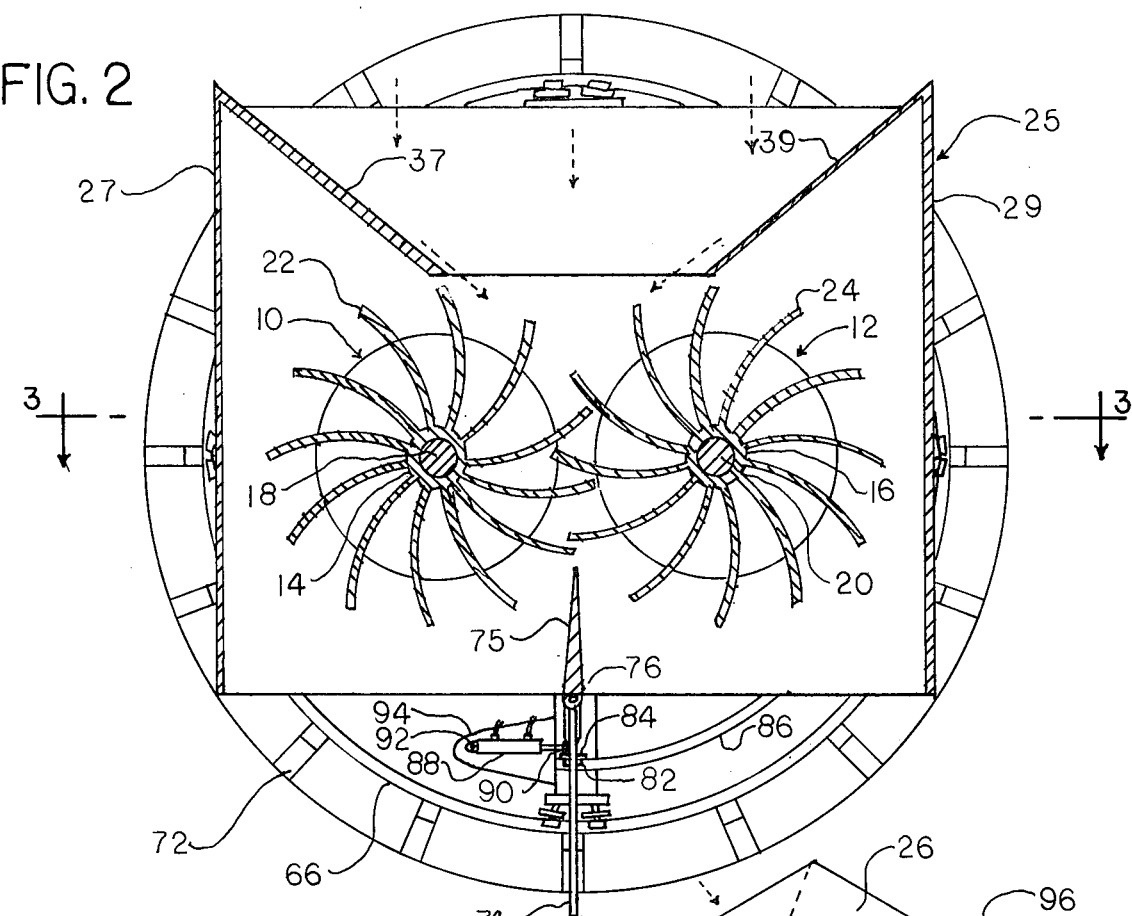
FIG. 2 is a top view partially in section of the apparatus shown in FIG. 1.

As shown in FIGS. 1 - 4 of the drawings, one form of the inventive wind power converter includes a pair of turbines 10, 12 formed by hollow cylindrical hubs 14, 16 (FIG. 2) mounted on axially parallel shafts 18, 20. The wind collection surfaces comprise a plurality of curved blades 22, 24 which extend radially outward from the hubs 14, 16. Since the blades 22, 24 extend along the hubs 14, 16 their entire length, the hubs provide longitudinal bracing to prevent radial deformation of the shafts 18, 20 or hubs 14, 16. As best seen in FIG. 2, the blades 24 of one turbine 12 overlap the blades 22 of the other turbine 10. Therefore, wind blowing between the turbines 10, 12 must strike the blades 22, 24. The elongated blades 22, 24 are curved to decrease the amount of wind spilled by the blades during rotation. Curving and overlapping the blades greatly increases the effectiveness of the inventive wind power converter. As shown in FIG. 2, the curvature of the blades 22 of turbine 10 is opposite to the curvature of the blades 24 of turbine 12. Thus, wind passing between turbines 10, 12 will cause rotation of the turbines in opposite directions, that is, turbine 10 rotates in a clockwise direction and turbine 12 rotates in a counterclockwise direction in FIG. 2.

The turbines 10, 12 are rotatably disposed within a rotatable housing 25 comprising upper and lower shaft-supporting sections or plates 26, 28 and lateral sections 27, 29. The turbine shafts 18, 20 are carried by bearings 30, 32, 34 and 36 which allow the turbines to rotate with relatively little friction. For this reason, only a relatively small amount of the energy imparted to the turbines by the wind is dissipated due to frictional resistance.

The front portion of the wind power converter of the invention has a pair of wind deflectors 37, 39 which funnel the wind between the turbines 10, 12 and substantially prevent the wind from striking the blades when they are positioned at the outside edge of each turbine. The wind deflectors 37, 39 are disposed between the plates 26, 28 at the top and bottom, respectively, and extend from the adjacent windward edges of lateral sections 27, 29 toward the midpoint between the turbines 10, 12. The deflectors 37, 39 terminate approximately the same distance from each other as the distance between turbine shafts 18, 20.

Referring to FIG. 3, the turbine shafts 18, 20 extend through the lower shaft-supporting plate 28 where they drive a pair of fluid motors 38, 40 which are secured to the plate 28. The fluid motors may be, for example, hydraulic fluid motors, compressed air motors or similar power transferring apparatus known in the art. Pressurized fluid flows from the motors 38, 40 through outlet lines 44. On the inlet side of the motors 38, 40, inlet lines 42 supply fluid to the motors at a relatively low pressure. The fluid motors 38, 40 are well known in the art and will not be described in detail. As shown in FIGS. 3, 4A and 4B, the fluid outlet lines 44 are connected to a hollow central shaft 46, and the fluid inlet lines 42 are connected to a second conduit 48 concentrically mounted about shaft 46. Shaft 46 and concentric conduit 48 each contain a plurality of circumferentially spaced throughbores 50, 52 respectively, which allow fluid to flow into and out shaft 46 and conduit 48. Surrounding the through-bores are manifolds 54, 56 communicating with fluid supply and return lines 57, 58. Relatively low-pressure fluid flows into the wind power converter through return line 58 and enters the cylindrical conduit 48 through manifold 56 and through-bores 52. The fluid then is pressurized by motors 38, 40 and directed through output lines 44. The high-pressure fluid flowing into shaft 46 exits from through-bores 50, is collected by manifold 54 and is carried away from the wind power converter through supply conduit 57.

The turbine housing 25 of the wind power converter is rotatably supported above the ground on vertically disposed central shaft 46 and on a plurality of beams 60 radiating therefrom. Thrust bearings 59, 61 are disposed on shaft 46 and concentric conduit 48 respectively to facilitate retention of the wind power converter in proper position during rotation and during high velocity winds. At the free end of each beam 60 is a mounting bracket 62 having flanged wheels rotatably mounted thereon. Wheels 63, 64 engage a peripheral annular track 66 with wheels 63 in contact with the top of the track and wheels 64 in contact with the bottom of the track. In the presence of an unusually high wind, wheels 64 which contact the bottom surface of the track 66 prevent the windward side of the wind power converter from lifting. The housing 25 also is supported on beams 60 by supporting members 68 connecting plate 28 of the housing with beams 60. The track 66 is supported on a foundation 70, preferably of poured concrete, by a plurality of supports 72 circumferentially spaced around the track 66.

Figure 1:
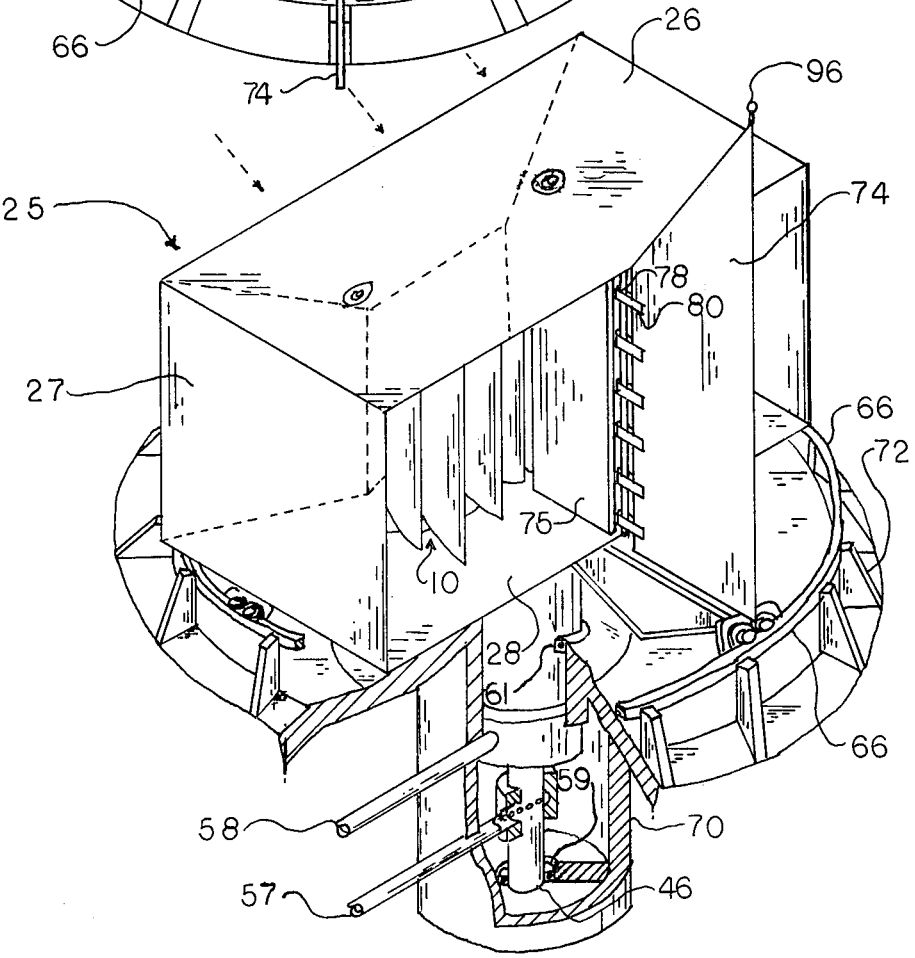
FIG. 1 is an isometric view of a wind power converter of the invention with vertically disposed turbines.

The wind power converter is pointed into the wind by a vertical vane 74 extending from housing 25 opposite to deflectors 37, 39. Since the wind power converter is rotatable on a horizontal plane, the vane 74 aligns with the direction of the wind. The vane 74 is pivotally connected to a fixed section 75 spanning shaft-supporting plates 26, 28 by a hinge arrangement comprising a tubular bar 76 extending vertically from top plate 26 to the bottom plate 28 around which a plurality of cylindrical sleeves 78 are slidably secured with extensions 80 of sleeves 78 being fastened to the vane 74. The outer end of the vane 74 is supported by wheels 82 rotatably secured to the lower outside surface of the vane 74 through a bracket 84. The wheels 82 rest upon the top surface of a track 86 carried by beams 60. As best illustrated in FIG. 2, the angular position of the directional vane 74 is controlled by a hydraulic ram 88 pivotally secured to the vane 74 at 90 and pivotally connected at 92 to a beam 60 through mounting bracket 84. The operation of the hydraulic ram 88 is controlled by a hydraulic actuator (not shown) which is well known in the art. The vane 74 is pivotable primarily for the purpose of disabling the wind power converter for maintenance. When the vane 74 is pivoted ninety degrees, it is aligned with the axes of the turbines 10, 12 thereby placing the axes of the turbines along the wind path. In this configuration, the wind is unable to strike the turbines and the turbines remain stationary, thereby easily allowing maintenance to be performed on the wind power converter. However, the ram 88 can be used also to place the vane 74 in intermediate positions to control the amount of energy produced by the wind power converter. One or more aircraft warning lights 96 may be mounted on the upper portions of the wind power converter, for example, on vane 74 as shown in FIG. 1.

The details of the mechanism for synchronizing the rotation of turbines 10, 12 to prevent the overlapping blades 22, 24 from striking each other are shown in FIGS. 4A and 4B. The rotation of shaft 18 of turbine 10 which extends through pump 38 is synchronized with the rotation of shaft 20 of turbine 12 by an arrangement including sprockets 93 on shafts 18, 20, interconnected through ball chains 91 to sprockets 95 on shafts 98. Shafts 98 are aligned so that gears 99 secured thereon mesh to operatively interconnect shafts 18, 20 of turbines 10, 12.

In operation, the vane 74 aligns itself with the wind direction, thereby rotating the wind power converter on the track 66 so that the wind is directed by deflectors 37, 39 between turbines 10, 12. The shafts 18, 20 of the turbines 10, 12 drive fluid motors 38, 40 which pressurize fluid flowing into the wind power converter through return line 58 and discharge pressurized fluid through supply conduit 57. Any shifting in the direction of the wind is compensated for by the vane 74, which maintains the wind power converter pointed into the wind. The pressurized fluid from supply conduit 57 is then transferred to one or more power-consuming devices (not shown), either directly or through a suitable energy-converting device, such as a hydraulic motor, an electric generator or a similar device, none of which are shown in the drawings.

A second embodiment of the inventive wind power converter is illustrated in FIGS. 5-8. This embodiment utilizes two horizontally disposed turbine sections 102, 104, each section containing two parallel aligned turbines 106, 108, 110, 112. The turbines are substantially identical to the turbines of the first embodiment, having cylindrical sleeves 114 mounted to turbine shafts 116, 118, 120, 122. The outside ends of the shafts extend through side mounting plates 124, 126 and are rotatably secured thereto through bearings 128, while the inner ends of the shafts extend through the walls of a fluid motor housing 130 (FIG. 8) and are rotatably secured thereto by bearings 132. The mounting plates 124, 126 and motor housing 130 form a support frame for the turbines 106, 108, 110, 112.

The turbines are enclosed by upper and lower covers or sections 134, 136 which extend from one side mounting plate 124 to the other 126 and are fastened thereto. Angularly mounted wind deflectors 138, 140 are secured to the mounting plates 124, 126 and covers 134, 136. The deflectors 138, 140 direct the wind striking the wind power converter between the covers 134, 136 into the area between the turbines. The deflectors 138, 140 further prevent the wind from striking the blades when they are positioned adjacent the covers 134, 136.

Figure 5:
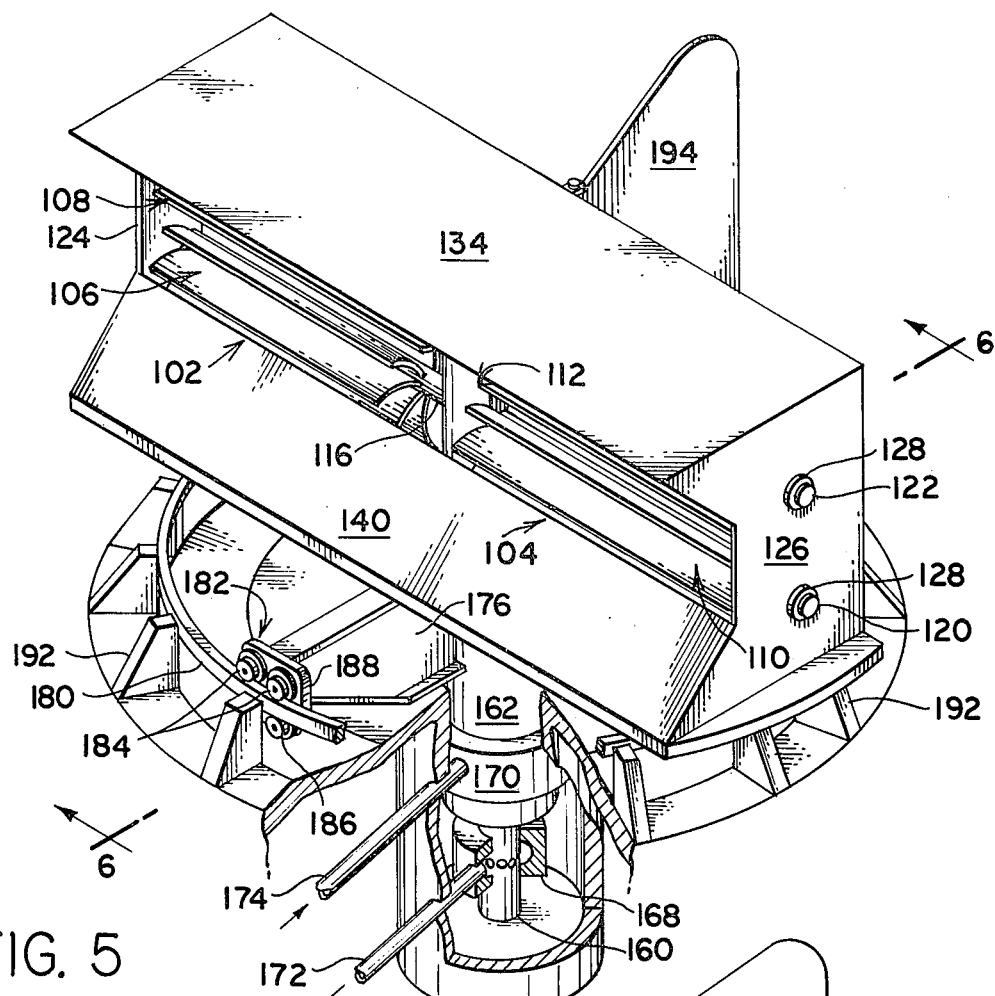
FIG. 5 is an isometric view of a second embodiment of the invention in which the turbines are horizontally disposed.
Figure 6:
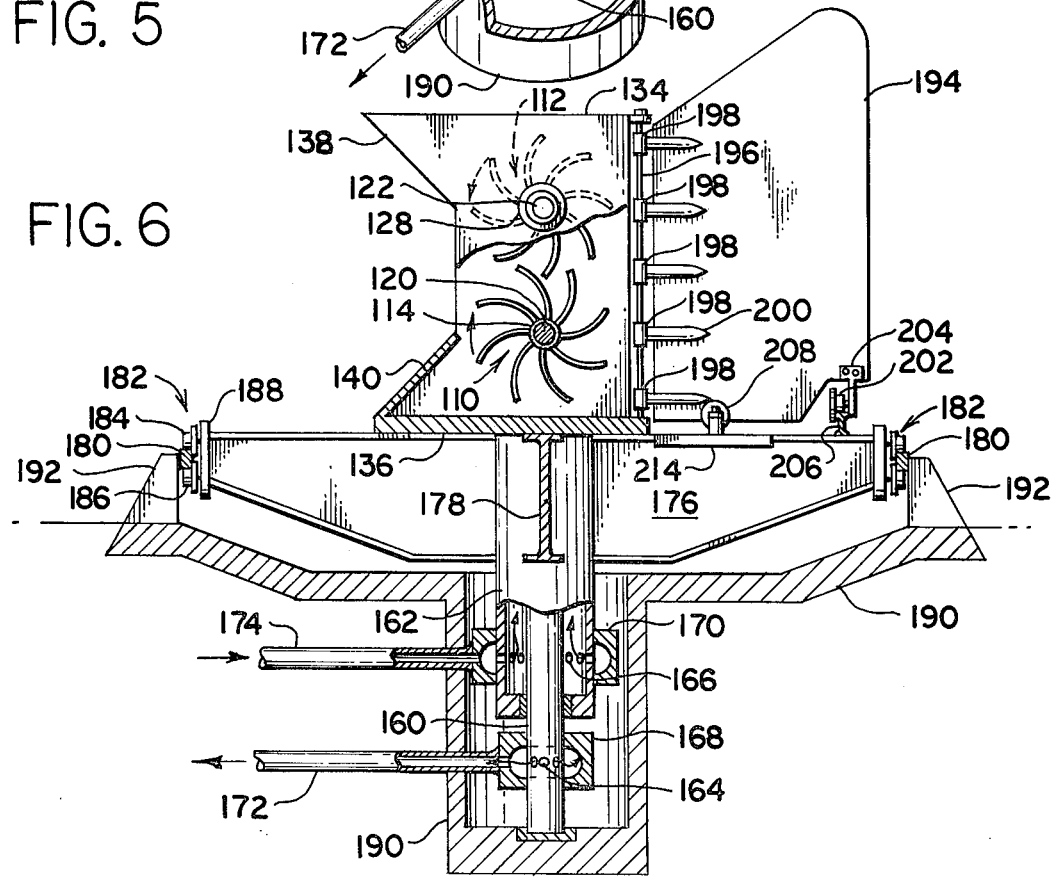
FIG. 6 is a cross-sectional view of the windmill of the second embodiment taken along the line 6—6 of FIG. 5.
Figure 8:
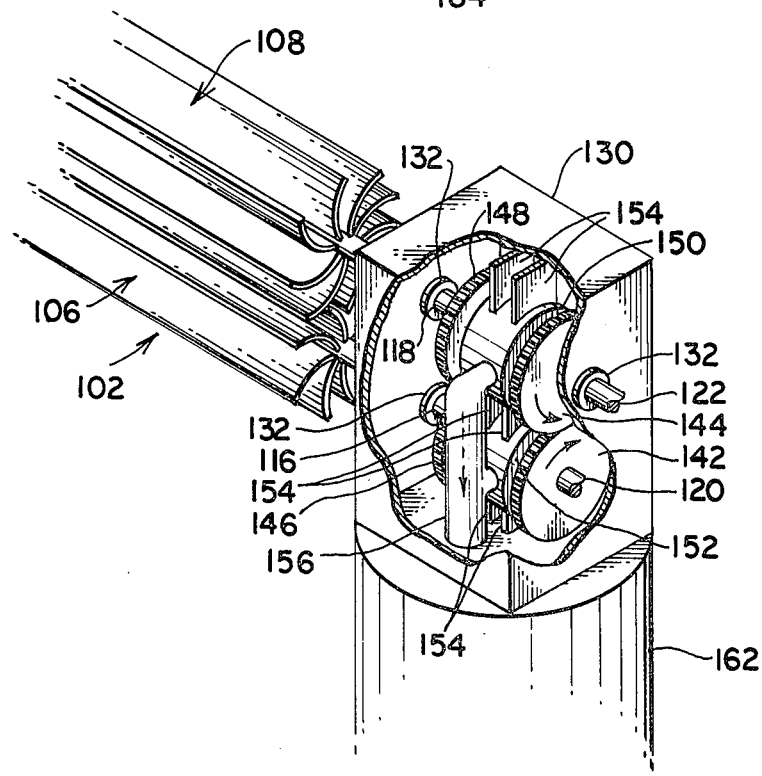
FIG. 8 is a fragmented isometric view of the windmill of the second embodiment showing the power transmitting portion of the apparatus.

The mechanism for synchronizing the upper turbines 108, 112 to the lower turbines 106, 110 to prevent the overlapping blades from striking each other is best illustrated in FIG. 8. The shafts 120, 122 for the turbines in section 104 are synchronized with each other through gears 142, 144. Similarly, the shafts 116, 118 for turbine section 102 are synchronized through gears 146, 148. If desired, a chain and sprocket arrangement such as described above and shown in FIGS. 4A and 4B may be utilized to synchronize the turbines, particularly with very large size wind power converters which would require gears 142, 144, 146, 148 of substantial size and weight. The shafts 116, 118, 120, 122 further drive a pair of fluid motors 150, 152 which are secured to the housing 130 and each other through vertical beams 154. As explained hereinafter, pressurized fluid flows from the motors 150, 152 through an outlet line 156 which extends downwardly. On the opposite side of the motors 150, 152, an inlet line (not shown) supplies fluid to the motors at a relatively low pressure. The fluid motors 150, 152 are well known in the art and may be hydraulic fluid motors, compressed air motors or similar pumping apparatus. Referring to FIGS. 5 and 6, the outlet line 156 is connected to a cylindrical conduit 160. The inlet line (not shown) is connected to a second cylinder 162 concentrically mounted about conduit 160.

Each of the conduits 160, 162 contains a plurality of circumferentially spaced through-bores 164, 166 which allow fluid to flow into and out of the conduits 160, 162. Surrounding the through-bores are manifolds 168, 170 communicating with fluid supply and return lines 172, 174. Relatively low-pressure fluid flows into the wind power converter through return line 174 and enters the cylindrical conduit 162 through manifold 170 and through-bores 166. The fluid is then pressurized by motors 150, 152 and directed downwardly through output conduit 156. The high-pressure fluid flowing into cylindrical conduit 160 exits through-bores 164, is collected by manifold 168 and is carried away from the wind power converter through supply conduit 172.

The bottom plate 136 rests on a pair of horizontal beams 176, 178 which are welded to the outside surface of the cylindrical conduit 162. The beams 176, 178 are supported on an annular track 180 by wheel assemblies 182. As best seen in FIG. 5, each of the wheel assemblies 182 includes a pair of spaced apart upper wheels 184 resting on the top surface of the track 180 and a pair of spaced apart lower wheels 186 contacting the lower surface of the track 180. The lower wheels 186 prevent unusually strong winds from raising the windward side of the wind power converter. The wheels 184, 186 are rotatably secured to beams 176, 178 through plates 188. Track 180 is supported on a foundation 190 (FIG. 6), preferably of poured concrete, by a plurality of supports 192 circumferentially spaced around the track 180.

The wind power converter is pointed into the wind by a directional vane 194 pivotally mounted behind the turbines. Since the wind power converter is rotatable on a horizontal plane, the directional vane 194 aligns with the direction of the wind. The directional vane 194 is pivotally secured to the cover 134 and bottom plate 136 by a hinge arrangement comprising a tubular bar 196 extending vertically from the cover 134 to the bottom plate 136 around which a plurality of cylindrical sleeves 198 are slidably secured. The sleeves 198 are fastened to the directional vane 194 by gussets 200. The outer end of the directional vane is supported by a wheel 202 rotatably secured to the lower outside surface of the directional vane 194 through a bracket 204. The wheel 202 rests upon the top surface of a track 206 which extends from the rear of beam 176 to the left-hand side of beam 178.

Figure 7:
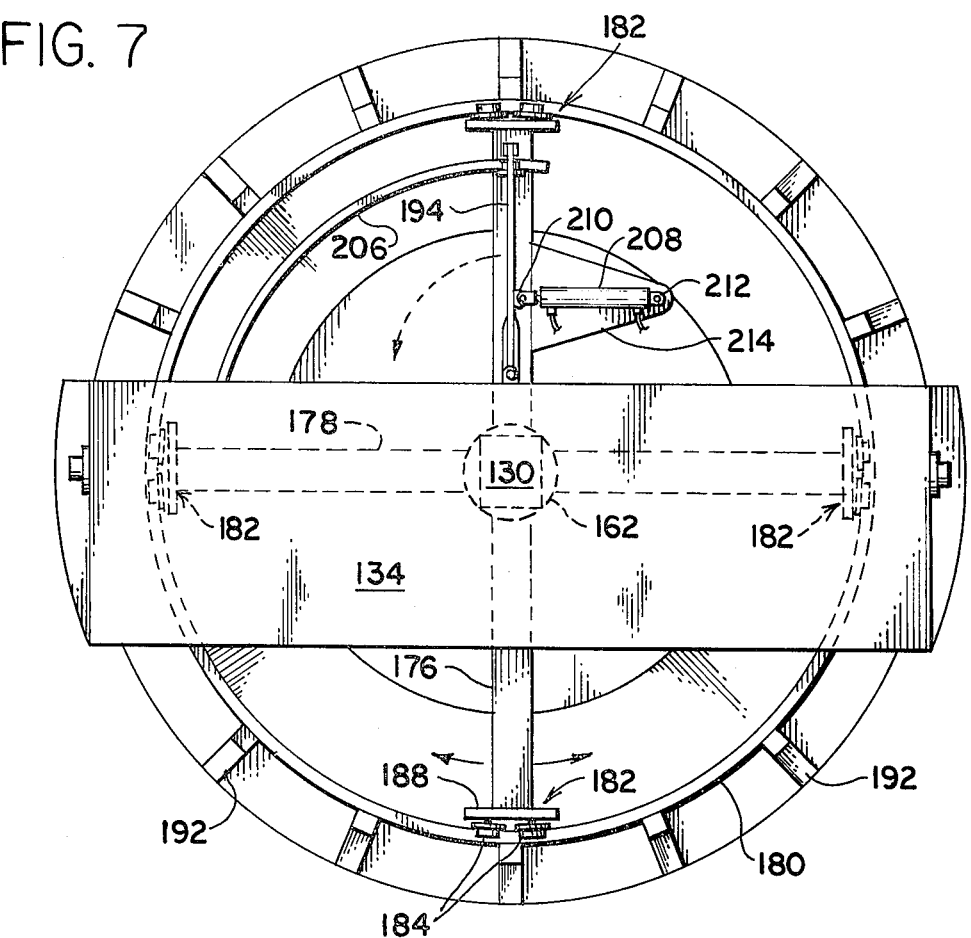
FIG. 7 is a top plan view of the windmill of the second embodiment.

As best illustrated in FIG. 7, the angular position of the directional vane 194 is controlled by a hydraulic ram 208 pivotally secured to the vane 194 at 210 and pivotally connected at 212 to the beam 176 through mounting bracket 214. The operation of the hydraulic ram 208 is controlled by a hydraulic actuator (not shown) which is well known in the art. The directional vane 194 is pivotable primarily for the purpose of disabling the wind power converter for maintenance purposes. When the directional vane 194 is pivoted 90°, it is aligned with the axes of the turbines, thereby placing the axes of the turbines along the wind axis. In this configuration, the wind is unable to strike the turbines and the turbines remain stationary, thereby easily allowing maintenance to be performed on the wind power converter. However, the ram 208 can also be used to place the directional vane 194 in intermediate positions to control the amount of energy produced by the wind power converter.

The operation of the wind power converter of the preferred second embodiment is essentially the same as that of the first embodiment. Wind striking the directional vane 194 rotates the unit so that the axes of the turbines 106, 108, 110, 112 are perpendicular to the wind. Wind from the area between the top cover 134 and the bottom plate 136 is funneled into the area between the turbines by wind deflectors 138, 140. The wind strikes the blades of the turbines, thereby rotating shafts 116, 118, 120, 122. The shafts, in turn, drive fluid motors 150, 152 which pressurize fluid into the wind power converter through return conduit 174 and discharge pressurized fluid through supply conduit 172. Subsequent changes in the wind direction rotate the wind power converter on the track 180, thereby maintaining the unit pointed in the direction of the wind.

The above description and the accompanying drawings show that the present invention provides a novel wind power converter which can operate with a high degree of efficiency to generate power on a commercial scale. The wind power converter of the invention utilizes a high proportion of the wind contacting the apparatus for the generation of power and operates effectively over a wide range of wind velocities. Furthermore, the wind power converter operates safely at high wind velocities which might cause damage to conventional windmills. In addition, the wind power converter of the present invention provides the above advantages in very large sizes which whould not be practical with conventional windmills thereby permitting the generation of power on a commercial scale economically.

It will be apparent that various modifications may be made in the wind power converter embodiments described in detail and shown in the drawings within the scope of the invention. For example, the foundations and supporting structures of the wind power converters illustrated may be altered to permit interchange of the respective housings and associated assemblies. Also, the distance that the wind power converter is supported above the ground may be varied for particular installations and topography. In addition, the wind deflectors may be pivotally mounted on their outer edges to provide control of the flow of wind through the midpoint between the turbines. Therefore, the invention is to be limited only by the following claims.

What is claimed is:

1. A wind power converter comprising:
   a pair of rotatable turbines with elongated blades disposed within a rotatable housing on axially parallel shafts, the curvature of the blades of one turbine being opposite to the curvature of the blades of the second turbine so that wind passing between said turbines will rotate the turbines in opposite directions;
   said housing including shaft-supporting sections at the ends of said turbines, lateral sections connecting said end sections, a pair of wind deflectors disposed between said end sections and extending from adjacent edges of said lateral sections toward the midpoint between said turbines and terminating approximately the same distance from each other as the distance between said turbine shafts, and a pivotally mounted vertically disposed vane extending from a portion of said housing opposite to said wind deflectors;

said rotatable housing being supported on a vertically disposed central shaft and on a plurality of beams radiating from said central shaft with the free end of each beam having at least one pair of flanged wheels engaging a peripheral annular track with one wheel of each pair in contact with the top of said track and the other wheel of each pair in contact with the bottom of said track;

means for synchronizing the rotation of said turbines;

fluid pumping means operatively connected to said turbines mounted on said rotatable housing adjacent the top of said central shaft;

conduit means within said central shaft communicating with said pumping means and adapted to be connected to remote power-consuming devices for extracting power from said wind power converter; and thrust bearings disposed on portions of said central shaft.

2. A wind power converter according to claim 1 wherein said turbines are disposed on vertical shafts.

3. A wind power converter according to claim 1 wherein said turbines are disposed on horizontal shafts.

4. A wind power converter according to claim 3 wherein two pairs of rotatable turbines are disposed on pairs of horizontal shafts extending in opposite directions from central pumping means.

5. A wind power converter according to claim 1 wherein said means for synchronizing said turbines includes chain and sprocket assemblies operatively connecting said turbine shafts.

6. A wind power converter according to claim 1 wherein said annular track is suspended above a concrete foundation on a plurality of supports circumferentially spaced around the periphery of said track.

7. A wind power converter according to claim 1 including actuating means for pivoting said vane.

8. A wind power converter according to claim 1 wherein the free end of said vane has a pair of wheels engaging an arcuate track.

9. A wind power converter according to claim 1 wherein said central shaft includes a conduit and a second conduit is circumferentially positioned about said shaft, said conduits communicating with inlet and outlet lines for said pumping means, and each of said conduits having a plurality of adjacent apertures surrounded by a manifold, and means for supplying fluid at a relatively low pressure to one of said manifolds and for removing fluid at a relatively high pressure from the other of said manifolds.

10. A wind power converter according to claim 1 wherein said fluid pumping means are connected to said turbine shafts.

* * * * *